United States Patent [19]

Bolognese et al.

[11] Patent Number: 5,349,420
[45] Date of Patent: Sep. 20, 1994

[54] IMAGER APPARATUS SUPPORT SYSTEM

[75] Inventors: Renato Bolognese, Savona; Rino Gandolfo, Roccavignale, both of Italy

[73] Assignee: Minnesota Mining and Manufacturing Company, St. Paul, Minn.

[21] Appl. No.: 17,149

[22] Filed: Feb. 12, 1993

[30] Foreign Application Priority Data

Mar. 27, 1992 [IT] Italy .......................... MI92 A 000726

[51] Int. Cl.⁵ ............................................. G03B 29/00
[52] U.S. Cl. .......................................... 355/75; 355/50; 355/72; 355/76; 242/615.2
[58] Field of Search ........................ 355/27, 50, 72, 75, 355/76; 226/25; 242/75.1, 76

[56] References Cited

U.S. PATENT DOCUMENTS

| | | | |
|---|---|---|---|
| 2,981,146 | 4/1961 | Kippino . | |
| 3,973,344 | 8/1976 | Frankel | 40/158 B |
| 4,035,074 | 7/1977 | Flor | 355/27 |
| 4,750,660 | 6/1988 | Kamimura | 266/199 |
| 4,835,557 | 5/1989 | Gandolfo et al. | 354/76 |
| 4,918,483 | 4/1990 | Otahe | 355/40 |

FOREIGN PATENT DOCUMENTS

| | | |
|---|---|---|
| 3809188 | 9/1988 | Fed. Rep. of Germany . |
| WO81/01750 | 6/1981 | PCT Int'l Appl. . |
| WO91/08512 | 6/1991 | PCT Int'l Appl. . |

Primary Examiner—Richard A. Wintercorn
Assistant Examiner—D. P. Malley
Attorney, Agent, or Firm—Gary L. Griswold; Walter N. Kirn; Charles D. Levine

[57] ABSTRACT

An imager apparatus for exposing a film with a plurality of recorded images separated by border areas includes an exposure site, a primary film path along which unexposed films are fed to the exposure site, a secondary film path along which exposed films are taken away from the exposure site, and a film driver at the exposure site. The film driver drives films between the primary and the secondary film paths. The film support for holding the film at the exposure site during exposure includes at least one rod on which the film rests. The rod contacts the film at only the border areas.

6 Claims, 3 Drawing Sheets

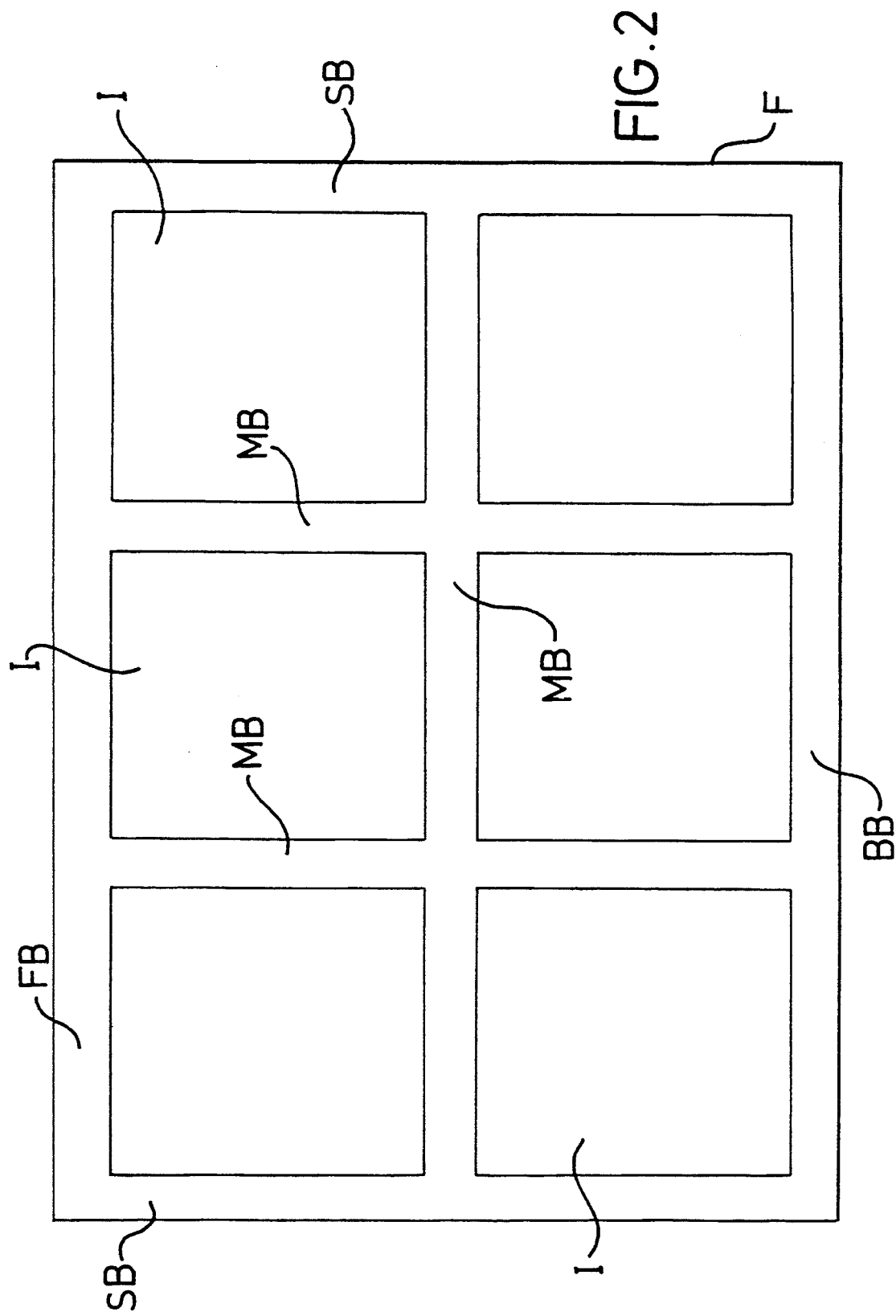

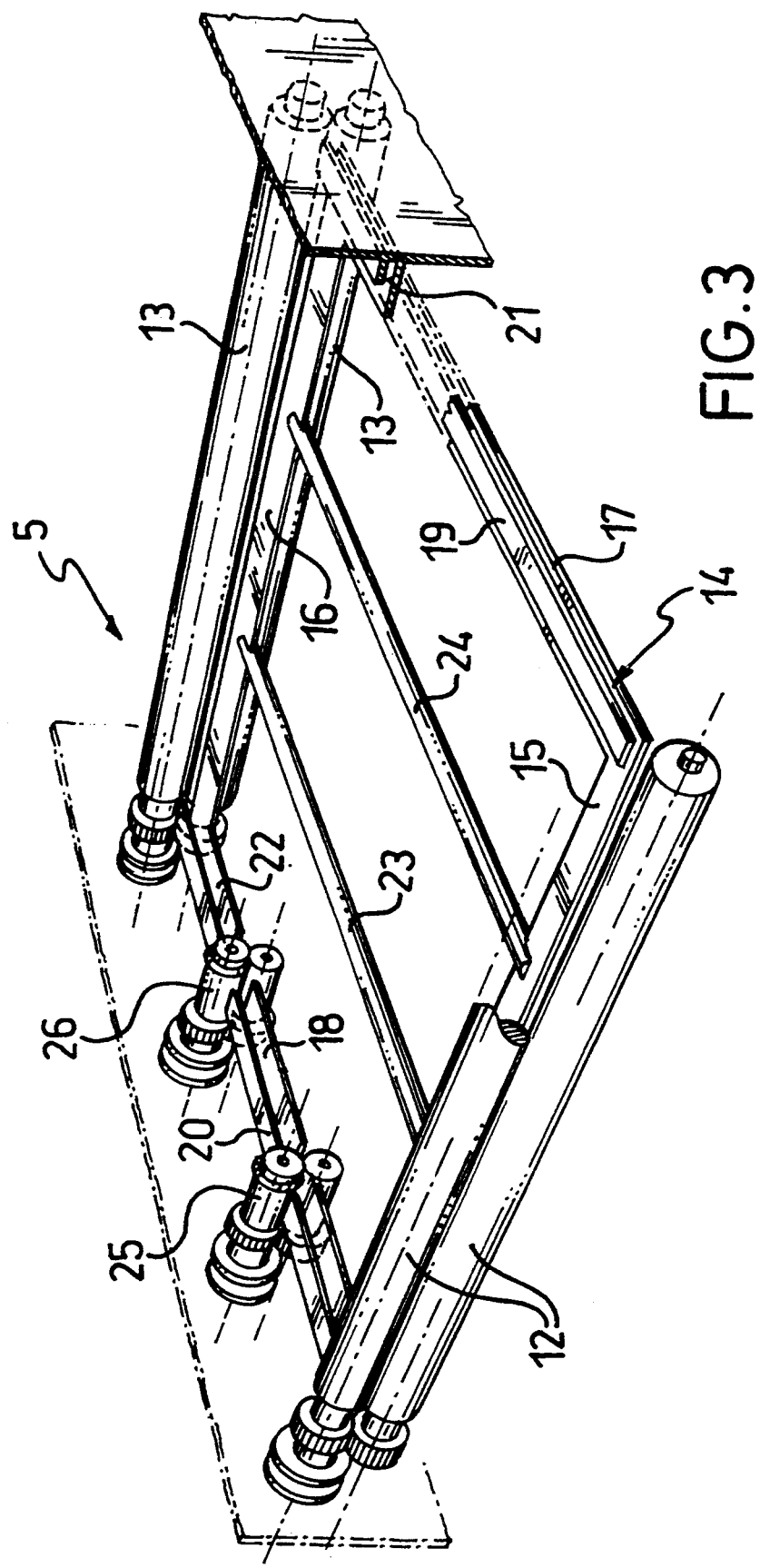

IMAGER APPARATUS SUPPORT SYSTEM

FIELD OF THE INVENTION

The present invention refers to an imager apparatus in which images are transferred from an electronic recording medium to a photographic film.

BACKGROUND OF THE INVENTION

Imager apparatus are normally used in digital radiography to allow a physician to examine digitally recorded images in a traditional manner by viewing a transparency rather than a computer display. These apparatus can use electronic capabilities to process (by reducing, enlarging, zooming, etc.) and compose several images on the same photographic film. These apparatus are called multi-imagers.

These apparatus normally include a light tight casing which houses an image projector which projects the processed and composed images onto a photographic film resting at an exposure site on a glass plate, called a focal plane. At exposure site, film drivers ensure proper movement of the film. Components are also provided to transfer the film from a feeding magazine to the exposure site and from the exposure site to a receiving magazine.

A critical aspect of the accuracy of image reproduction is in the optical characteristics of the focal plane. A glass plate typically is used at the focal plane to support the film. However, very small imperfections in planarity, surface parallelism, and finishing and positioning and improper cleaning or maintenance of the glass plate can lead to inaccurate image reproduction.

There is a need for an imager apparatus which produces a highly accurate image reproduction, without defects or distortions. This is critical in the medical field since a proper medical interpretation of an image requires an accurate reproduction.

SUMMARY OF THE INVENTION

The present invention relates to an apparatus for exposing a film with a plurality of recorded images separated by border areas. The imager apparatus includes an exposure site, a primary film path along which unexposed films are fed to the exposure site, a secondary film path along which exposed films are removed from the exposure site, and a film driver at the exposure site to drive film between the primary and the secondary film paths.

A film support holds the film at the exposure site during exposure. The film support includes at least one rod on which the film rests at the exposure site. The rod contacts the film at only the border areas of the film.

The border areas are aways located at the same position on the film, since the film is always divided in the same manner to create typically six or four images. Therefore, the border areas of the film, which are not used for image reproduction, can be easily and safely used to support the film using rods. A glass plate and all of its drawbacks are eliminated. Preferably, the rods are parallel to the sliding direction of the film to and from the exposure site. As the portions of film which slide and contact on the rods during film feeding to and from the exposure site are confined to the border areas, any defects or dirt on the rods affect only the border areas of the film and not the image areas. Preferably the rods have a circular cross section and a friction reducing liner to smooth and reduce contact between the rods and the film.

The images are projected from a projector located in the casing of the film. An empty area between the projector and the exposure site is accessed through a door. This arrangement allows easy intervention in case of film misfeeds. Misled film can be reached and removed from the exposure site simply by opening the door and grasping the film through the rods.

BRIEF DESCRIPTION OF THE DRAWINGS

FIG. 2 is a plan view of a photographic film showing the different areas thereon.

DETAILED DESCRIPTION OF PREFERRED EMBODIMENTS

Figure 1:
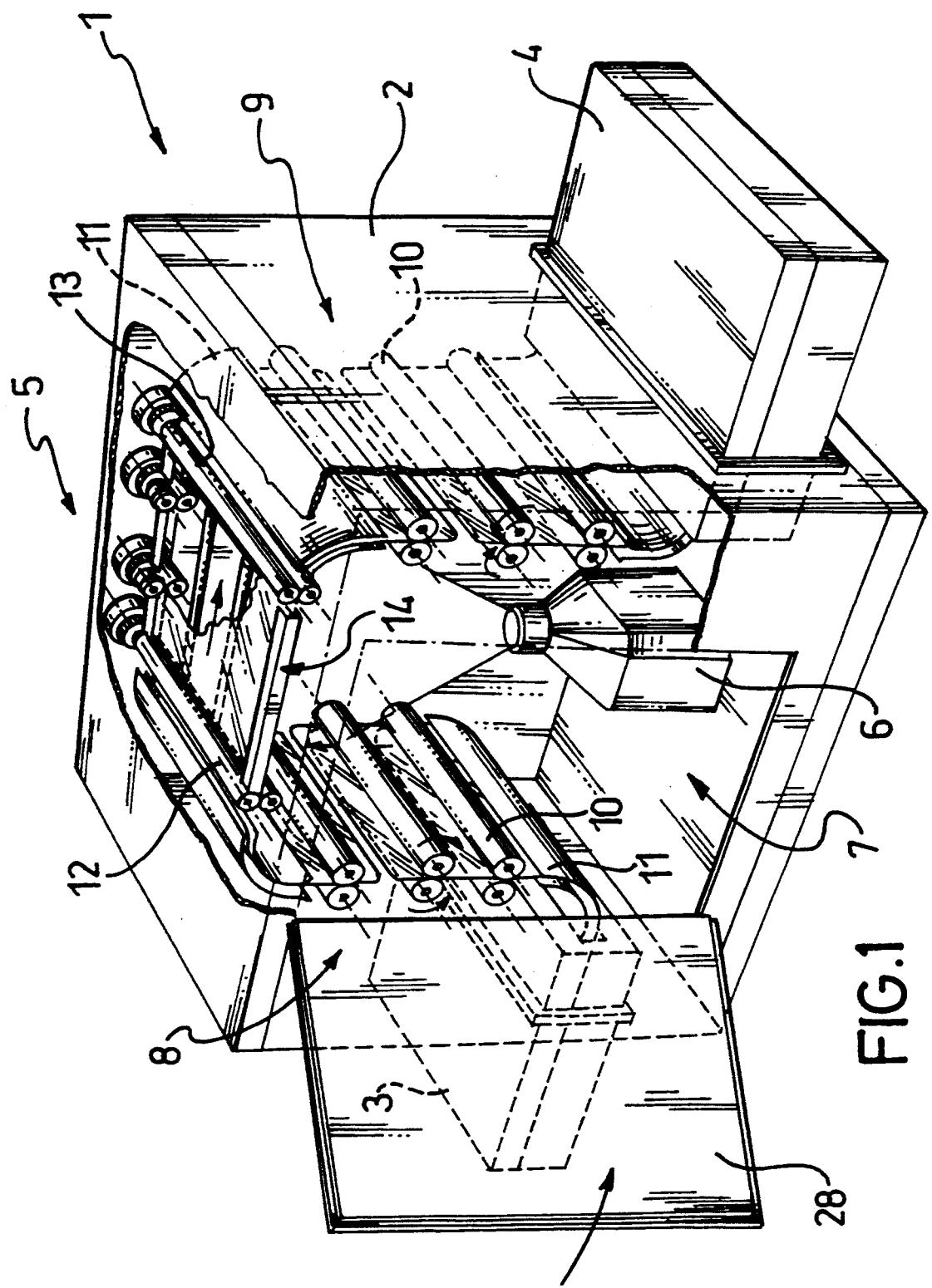
FIG. 1 is a perspective schematic view of an apparatus according to the present invention.

The imager apparatus 1 of the present invention can transfer six images onto the same photographic film. Upon exposure six image areas I are defined on the film F, separated by middle border areas MB and surrounded by a back border area BB, a front area FB, and two side border areas SB, as shown in FIG. 2.

As shown in FIG. 2, the imager apparatus 1 includes a light tight casing 2, which supports two magazines for the photographic films F. A feed magazine 3 for the unexposed films and a receiver magazine 4 for the exposed films are mounted in the light tight casing 2. The two magazines 3, 4 are light tight per se and are light tight when connected to the casing 2 in a conventional manner.

The casing 2 includes an exposure site 5 in the upper portion of the casing 2, and a projector 6, of any known type, in the lower portion of the casing 2. The projector 6 is positioned substantially opposite to the exposure site 5. An empty area 7 is formed within the casing 2 between the projector 6 and the exposure site 5.

A primary film path 8 extends between the feed magazine 3 and the exposure site 5. A secondary film path 9 extends between the exposure site 5 and the receiver magazine 4. Each path 8, 9 is defined by pairs of rollers 10 and fixed bent guides 11.

An entry pair of rollers 12 located on one side of the exposure site 5, and an exit pair of rollers 13 is located at the opposite side of the exposure site. The pairs of rollers 12, 13 are spaced by a film supporter such as an exposure grid 14 on which tile film F rests during exposure.

Figure 3:
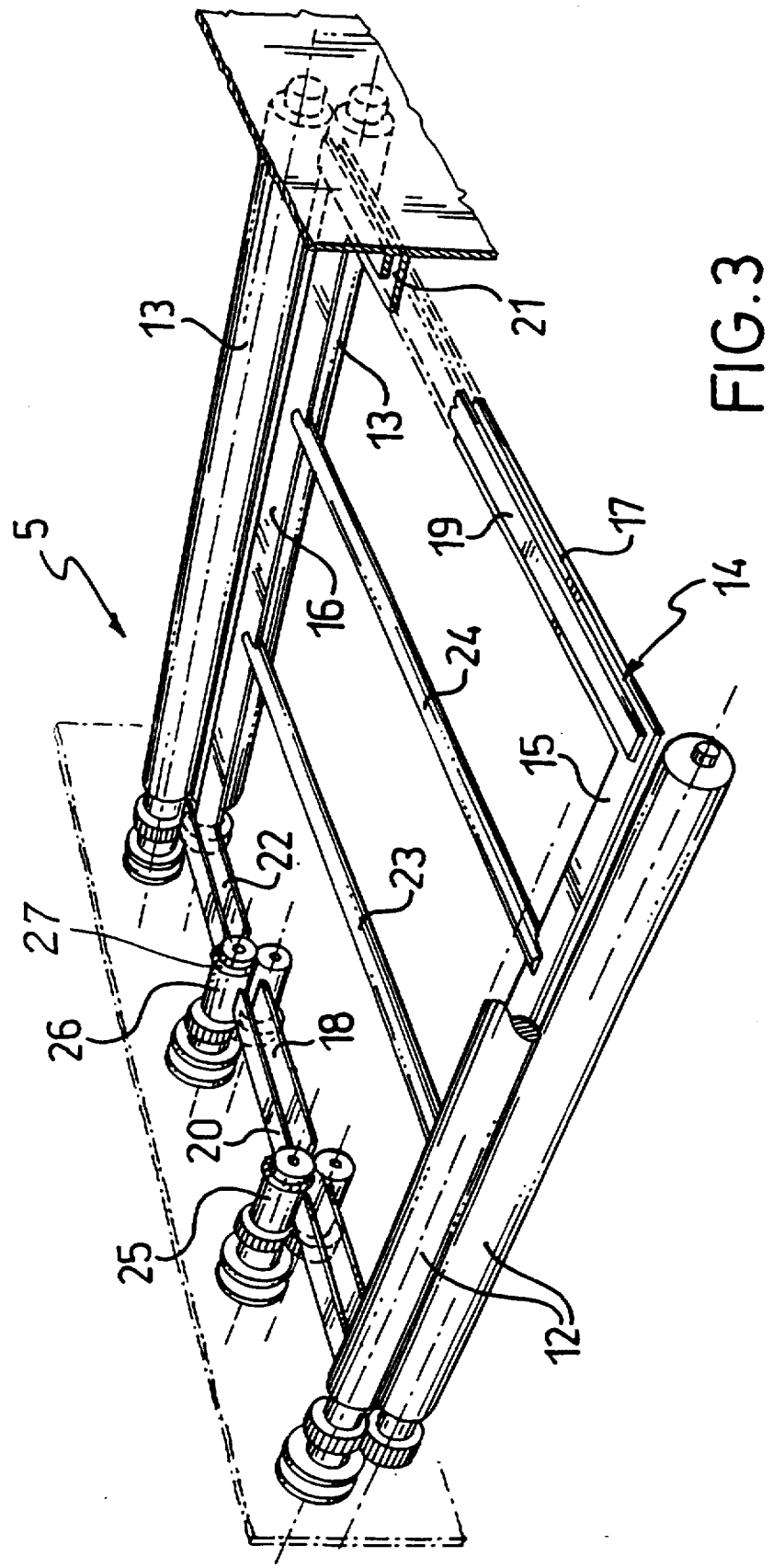
FIG. 3 is a perspective view of the exposure site of the apparatus of FIG. 1, in an enlarged scale.

As shown in FIG. 3, the exposure grid 14 includes a rectangular frame formed of two transverse bands 15, 16 and two longitudinal bands 17, 18. The frame is slightly smaller than the film F. Two upper bands 19, 20 are provided over and along the longitudinal bands 17, 18 and define sliding grooves 21, 22 between respective pairs of bands 17, 19 and 18, 20.

The exposure grid 14 also includes two rods 23, 24, fixed to and connecting the transverse bands 15, 16 of the frame. The rods 23, 24 each have a circular cross section and are parallel to each other and to the sliding direction of the film F. The rods 23, 24 have a low friction surface which may be obtained either by finishing the rods themselves, or by placing a friction reducing liner on the rods.

A film driver, located at the exposure site 5, drives films F between the entry rollers 12 and the exit rollers 13. The film driver includes two pairs of driving wheels 25, 26 which are located on the same side of the apparatus 1 to act on the same side border SB of the film F. The side border SB is slidingly engaged in the grooves 22 between the bands 18, 20. The groove 22 is interrupted by the wheels 25, 26. The wheels 25, 26 and the rollers 10, 12, 13 are driven by a known driver (not shown).

Preferably, at leats one wheel of each pair has a friction liner, such as a rubber ring 27. In the illustrated embodiment, the upper wheels 25 have the rubber ring 27. The casing 2 has a door 28, which provides access from below to the empty area 7 and the exposure site 5 inside of casing 2.

In operation, a film F is carried from the feed magazine 3 along the primary path 8 to the exposure site 5. The entry rollers 12 push the film F with its side borders SB into the grooves 21, 22. Both pairs of driving wheels 25, 26 engage the film F while it is still driven by rollers 12, and transport the film to the proper exposure position. Smooth driving is ensured by grooves 21, 22 and by the rubber rings 27 on the wheels 25. After exposure, the wheels 25, 26 drive the film F from the exposure site 5, and push it into the pair of rollers 13. The film F is driven from the exposure site 5 and to the receiver magazine 4, along the secondary path 9, by rollers 10.

During exposure, the film F rests onto the exposure grid 14, particularly onto the rods 23, 24 and is held in place by only the wheels 25, 26 and the grooves 21, 22. The film F rests on the rods 23, 24 and on the bands 15, 16, 17, 18, 19, 20. No other support is provided for the film F. No glass plate or similar structure is used. Therefore, the exposure grid 14, with its bands 15, 16, 17, 18, 19, 20 and rods 23, 24 constitutes the entire support for holding the film F at the exposure site 5 during exposure.

The rods 23, 24, of course, do interfere during exposure of the film F. However, the film F is not exposed with a single image (which would be interrupted by the rods 23, 24), but with a multiple image consisting of six different images. The film F receives the six images at six different locations, image areas I, which are separated by border areas B. By properly positioning the rods 23, 24, when the film F rests on the exposure grid 14, the rods 23, 24 contact the border areas B only, not the image areas I. (More precisely, the rods 23, 24 contact the portions of the film F which will become border areas after exposure, since the distinction between image areas and border areas takes place after exposure). Therefore, rods 23, 24 do not interfere with exposed images.

The support provided by the exposure grid 14 holds the film F without inducing deformations which would alter the images. With typical size films, this is true with a multi-imager set for six images, in which two rods are used, but also with a multi-imager set for four images, in which only one rod is used.

A transverse rod for additional support could be used. However, it is preferred not to use a transverse rod because it could scratch the film during sliding, and scratches from a transverse rod would damage the image areas. Any possible scratches caused by longitudinal rods 23, 24 are confined to the border areas.

The problems of reproduction quality which are associated to the glass plate are completely eliminated in this apparatus. In particular, cleaning is not so critical, since dirt particles on the rods do not affect image reproduction.

A further advantage of this apparatus is the ease of film removal. There is no barrier between the empty area 7 and the exposure site 5. A door 28 allows access to misled films in any part of the apparatus, without the need for further openings.

We claim:

1. An imager apparatus for exposing a film with a plurality of recorded images separated by middle border areas intermediate the edges of the film, wherein the apparatus comprises an exposure site, film driving means located at the exposure site for driving film though the exposure site and film supporting means for holding the film at the exposure site during exposure, characterized in that the film supporting means comprises at least one rod on which the film rests, wherein the rod contacts the film at only the middle border areas of the film.

2. The imager apparatus according to claim 1 wherein the rod is parallel to the sliding direction of the film to and from the exposure site.

3. The imager apparatus according to claim 1 wherein the rod has a circular cross-section.

4. The imager apparatus according to claim 1 wherein the rod comprises a friction reducing liner on the outer surface.

5. The imager apparatus according to claim 1 further comprising a plurality of bands which form a frame at the exposure site and wherein two parallel rods are connected to the frame to form an exposure grid.

6. The imager apparatus according to claim 1 further comprising a casing, wherein the exposure site is located at one surface of the casing; a projector located in the casing opposite to the exposure site, wherein the film contacts a surface of the rod opposite to that facing the projector; and a door in the casing which provides access to the interior of the apparatus.

* * * * *

UNITED STATES PATENT AND TRADEMARK OFFICE
CERTIFICATE OF CORRECTION

PATENT NO. : 5,349,420　　　　　　　　　　　　　　　　　　Page 1 of 2
DATED　　　 : September 20, 1994
INVENTOR(S) : Bolognese It is certified that error appears in the above-indentified patent and that said Letters Patent is hereby corrected as shown below:

Delete Drawing Sheet 3 of 3, Fig. 3, and substitute therefor the Drawing Sheet, consisting of Fig. 3, as shown on the attached page.

Signed and Sealed this

Second Day of May, 1995

Attest:

BRUCE LEHMAN

*Attesting Officer*　　　　*Commissioner of Patents and Trademarks*